(12) United States Patent
Grasso et al.

(10) Patent No.: US 6,826,453 B1
(45) Date of Patent: Nov. 30, 2004

(54) METHOD AND SYSTEM FOR EMISSION SUPPRESSION IN DETECTION OF DATA CARTRIDGE LABELS

(75) Inventors: Charles Grasso, Louisville, CO (US); Monte Pearson, Westminster, CO (US); Robert S Creager, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/533,032

(22) Filed: Mar. 22, 2000

(51) Int. Cl.[7] .......................... G05B 15/00; G05B 19/00
(52) U.S. Cl. .................. 700/259; 700/245; 700/251; 700/258; 901/1; 901/42; 901/47; 414/275; 414/280; 414/331.05; 414/331.1; 414/331.11; 414/807; 414/7
(58) Field of Search ............................... 700/245, 258, 700/251, 259; 901/1, 42, 47; 701/23; 360/92; 219/124.34; 348/818, 819; 180/168; 235/283, 462.33, 383; 414/275, 280, 331.1, 331.05, 807, 331.11

(56) References Cited

U.S. PATENT DOCUMENTS

| | | | | |
|---|---|---|---|---|
| 4,638,445 A | * | 1/1987 | Mattaboni | 701/23 |
| 4,864,511 A | | 9/1989 | Moy et al. | |
| 4,969,108 A | * | 11/1990 | Webb et al. | 700/259 |
| 5,237,468 A | * | 8/1993 | Ellis | 360/92 |
| 5,365,285 A | * | 11/1994 | Kizuya et al. | 348/818 |
| 5,622,470 A | * | 4/1997 | Schaefer et al. | 414/807 |
| 5,661,287 A | * | 8/1997 | Schaefer et al. | 235/383 |
| 5,850,569 A | | 12/1998 | Luif et al. | |
| 6,115,648 A | * | 9/2000 | Gallo | 700/218 |
| 6,213,705 B1 | * | 4/2001 | Wilson | 414/274 |

OTHER PUBLICATIONS

ADIC, AML/J, Automated mixed media library, 200, Internet, pp. 1–6.*
ADIC, AML/2, Automated mixed media library, 200, Internet, pp. 1–6.*
Thomsen et al., Collecting EEG signals in teh improved data library, 1997, Internet, pp. 33–40.*
ADIC, DAS, 1996, Internet, pp. 1–2.*

* cited by examiner

Primary Examiner—Thomas G. Black
Assistant Examiner—McDieunel Marc
(74) Attorney, Agent, or Firm—Wayne P. Bailey; Merchant & Gould

(57) ABSTRACT

A system and method for minimizing electromagnetic radiation emissions from a data cartridge handling library employs intermittent operation of the video camera to ascertain correct bin locations and verify automated access between bin locations. This intermittent operation is utilized when an error is suspected or upon a predetermined routine to verify manipulation accuracy.

16 Claims, 3 Drawing Sheets

METHOD AND SYSTEM FOR EMISSION SUPPRESSION IN DETECTION OF DATA CARTRIDGE LABELS

BACKGROUND OF THE INVENTION

1. Field of the Invention

The present invention relates generally to data storage subsystems, and more particularly to a robotic system and method for identifying data cartridge locations with reduced electromagnetic emissions in a data cartridge library system.

2. Description of Related Art

A typical digital data cartridge handling library includes number of columns of stacked bins containing data cartridges positioned around a centrally located manipulating arm with a cartridge grasping hand which can rotate, translate and elevate to position the hand in front of a particular bin containing the desired cartridge. The arrangement is sometimes called a "silo" arrangement, borrowing a term from the farming industry. The data cartridges may be optical data disks, tape cartridges or magnetic disc cartridges, depending on the type of recording apparatus involved. Typically, the data cartridges are data tape cartridges and the drive is a tape drive.

When the manipulating arm is properly positioned opposite a desired bin or cartridge slot in the desired column, the arm automatically extends and the hand grips the cartridge. The arm retracts, pulling the cartridge out of the bin. The arm then rotates, elevates, and moves the hand in or out to position the gripped cartridge into a cartridge drive apparatus such as a tape drive so that the data on the cartridge may be read or appropriately changed as required by the host computer system. When the operations requiring the cartridge to be in the drive are completed, the host computer then directs the manipulating arm to replace the cartridge in its assigned bin and then proceed with obtaining a next cartridge, if needed.

A CCD camera located on the hand periodically senses the location of the hand in order to precisely position the hand and provide location information feedback to the manipulator controller. This camera also has a linear array of LEDs arranged to project a line of red light to illuminate the tape cartridge bin markers as well as the identifying bar code labels on the cartridges. Since the LEDs and the camera are typically maintained on at all times, much of the electronics circuitry for camera control and signal processing is mounted on the hand with the camera. This component mass must be elevated, translated and rotated as part of the robot manipulator apparatus.

One of the byproducts of these data cartridge handling libraries is the production of unwanted noise. This noise, in particular, includes electromagnetic radiation (EMR) noise which can adversely affect other components and/or systems located nearby, such as peripheral devices, computers, video monitors, etc. Consequently, the cartridge libraries are typically shielded to prevent escape of the EMR or at least minimize the transmission of EMR.

One of the prime sources of unwanted EMR in these library systems originates with the electronic components located on the hand itself. Therefore significant amounts of material are utilized on the hand to effectively shield the surrounding environment from the EMR. This increases the size and mass of the hand and therefore the manipulator arm strength and mass must be appropriately sized in order to overcome inertial forces and produce the desired movements in the desired time periods in order to optimally minimize the time required for a "pick" or "put" operation to be performed. It is with respect to these and other considerations that the present invention has been made.

SUMMARY OF THE INVENTION

The present invention is a system and method for use in a data cartridge handling library for reducing the emissions of electromagnetic radiation (EMR) from the data cartridge handling library. The method basically involves turning on the positioning camera located on the manipulator hand in the library silo only when an anticipated desired bin location is approached during an audit operation.

More particularly, the method in accordance with the present invention comprises storing cartridges in tape handling library storage bins, turning on the manipulator camera, performing an audit of all of the cartridges in the storage bins with the manipulator hand, storing the bin location coordinates for each bin containing a cartridge along with cartridge identification data in a database, turning off the camera, and subsequently retrieving cartridges from the bins by utilizing the bin location coordinates.

These and various other features as well as advantages which characterize the present invention will be apparent from a reading of the following detailed description and a review of the associated drawings.

DETAILED DESCRIPTION OF THE PREFERRED EMBODIMENT

Figure 1:
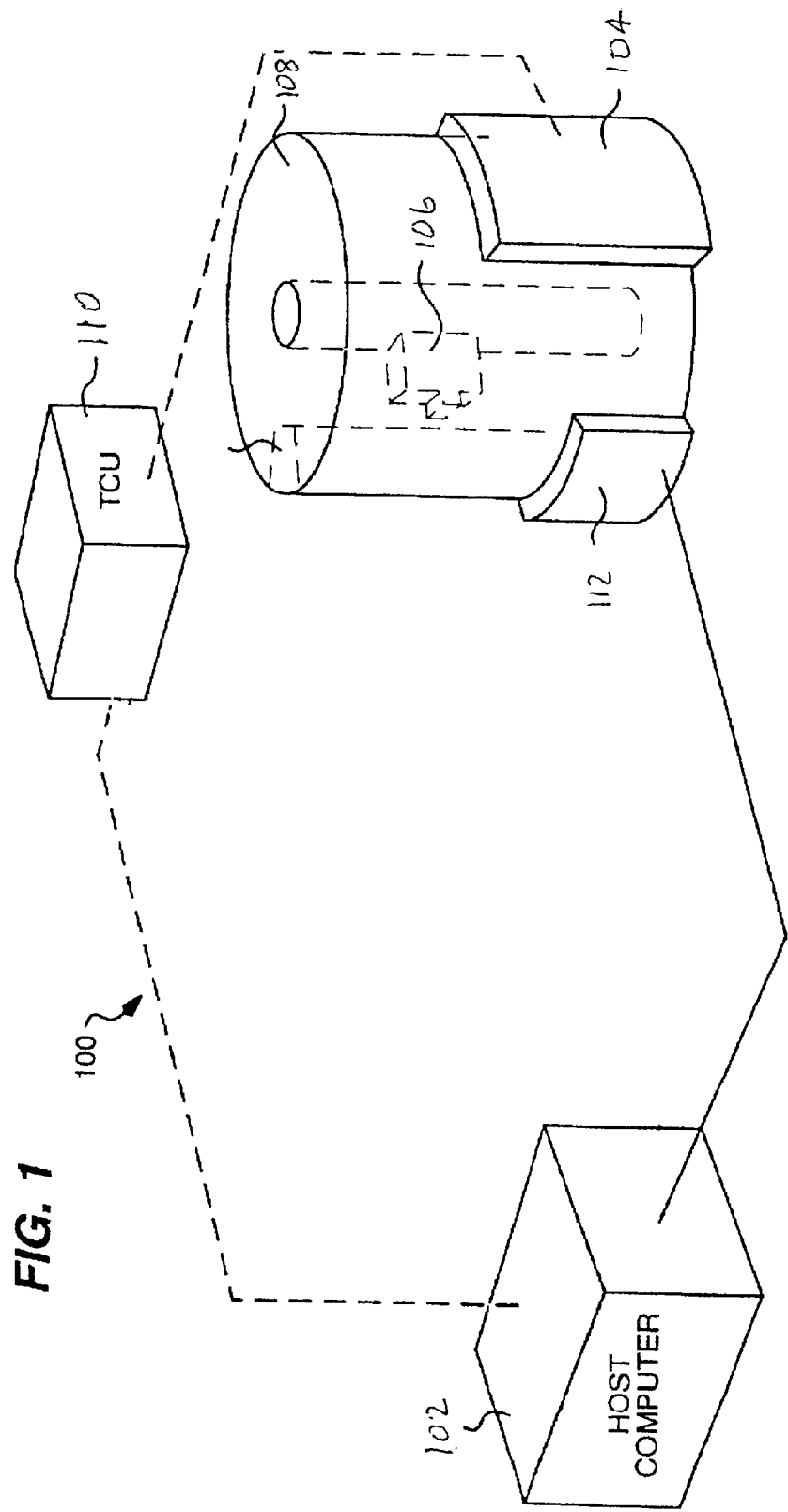
FIG. 1 is a schematic representation of a cartridge library system including a host computer, data cartridge storage silo and a storage controller in accordance with a preferred embodiment of the present invention.

FIG. 1 depicts an automated cartridge library system 100. Operation of automated cartridge library system 100 is directed by a host computer 102. Host computer 102 communicates with a library control unit (LCU) 112. The operation of a robot arm 106 within a library storage module (LSM) 108 is governed by the library control unit (LCU) 112 which interprets signals from host computer 102 and provides appropriate signals to the robot manipulator arm 106 to control its motion and operation. Signals from host computer 102 control the handling and storage of tape cartridges within the library storage module 108. Signals between host computer 102 and the library storage module 108 are conducted over conductors which are represented by the solid lines in FIG. 1. Data to be written to a tape cartridge (not shown in FIG. 1) or read from a tape cartridge is communicated over data lines, represented by the dotted lines of FIG. 1, through the tape control unit (TCU) 110. TCU 110 controls the operation of each of the tape drives 104 associated with LSM 108.

In general terms, when there is a need to read data from a tape cartridge in LSM 108, robot arm 106, in response to signals from the host computer 102, retrieves the appropriate tape cartridge from a storage cell and inserts the tape cartridge in a tape drive 104. Signals from host computer 102 through the TCU 110 then control the reading/writing of data from/to the tape cartridge.

Figure 2:
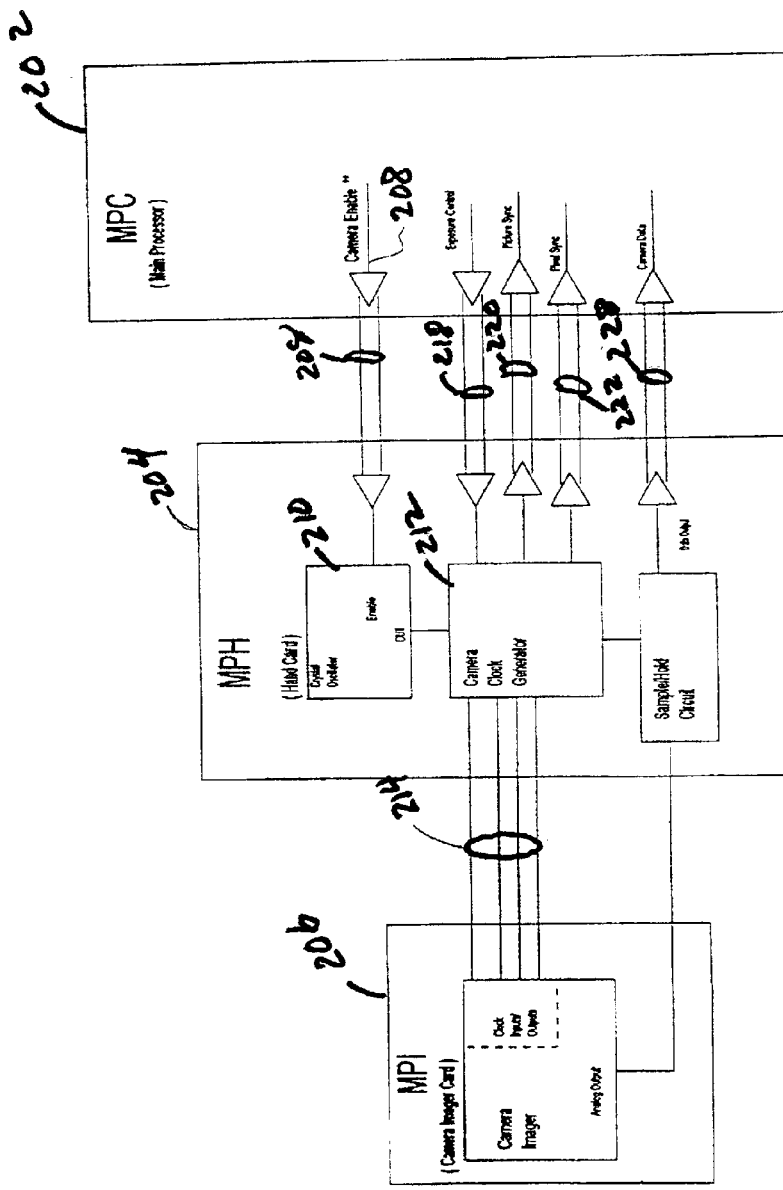
FIG. 2 is a block diagram of the hand manipulator storage controller microprocessors in one preferred embodiment of the present invention.

As shown in block diagram form in FIG. 2, the library control unit (LCU) 112 which controls the robot manipulator arm 106 has a main microprocessor 202. The robot arm 106 has a robot manipulator hand microprocessor 204 and a camera imager microprocessor 206, the latter two of which are physically located on the gripper hand of the robot arm 106.

The main processor 202 provides a camera enable signal to the crystal oscillator 210 in the hand microprocessor 204. When enabled, the crystal oscillator 210 provides a clock input to the camera clock generator 212. The camera clock generator 212 in turn provides clock input and output signals 214 to the camera imager 216 in the camera imager microprocessor 206. The main processor 202 also provides image exposure control, picture synchronization and pixel synchronization signals to the clock generator 212 via lines 218, 220 and 222 respectively. When the camera clock generator 212 is turned on, the camera imager microprocessor 206 starts the camera and analog output signals are passed from the camera imager 206 via line 224 to a sample/hold circuit 226 and thence through buffers to the main computer microprocessor 202 via lines 228.

Microprocessor 202 stores library cartridge identification data and position information in a database which may be located in the LCU 112. In order to accurately position the hand of the manipulator arm 106 to retrieve a cartridge or place a cartridge in a particular bin, the LCU 104 must have accurate location information as well as cartridge identification information. This information is gathered initially through a software "Audit Subsystem" routine which reads and catalogues each and every bin location and its contents into the database in the LCU 112. This database is subsequently utilized by the LCU 112 to control the operation of the robot arm 106 during normal cartridge retrieval operations.

During the initial information gathering operation, or performance of the Audit Subsystem 303, the robot manipulator 106 systematically drives to anticipated bin location and reads picture information identifying the exact bin location with the hand camera. The content of each bin is also read with the manipulator hand camera and associated with the location. This data is then stored for subsequent tape cartridge handling operations without the use of the hand camera.

Typically, the stored information only is utilized to place and retrieve cartridges from and to the bins without the aid of the robot manipulator hand camera. However, periodically, and whenever cartridge changes are made, the Audit Subsystem routine is invoked in order to add data to the database and/or verify the accuracy of hand manipulation or travel. Thus, during normal operation, the camera located on the manipulator arm is off and not used, thus minimizing any EMR emissions from the library.

Figure 3:
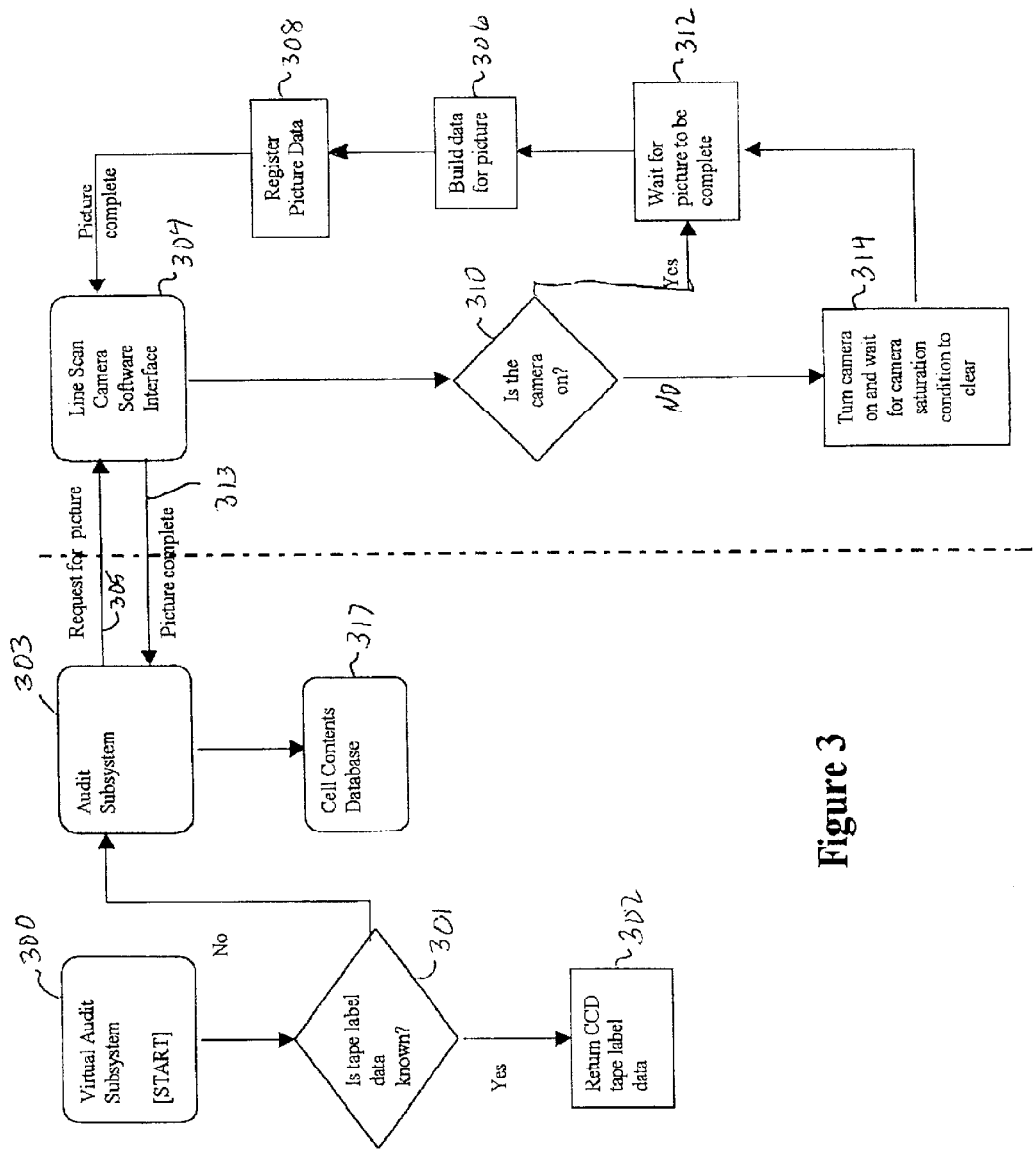
FIG. 3 is a process flow diagram of operations of the audit software routine in the preferred embodiment of the present invention shown in FIG. 2.

Referring now to FIG. 3, a flow diagram of the operational software steps in the Audit subsystem 300 is shown. The LCU 112 triggers the virtual Audit Subsystem 300 when tape cartridges are added or replaced, and periodically to verify the accuracy of hand operation. The virtual Audit Subsystem 300 transfers control to operation 301 where the Database is queried. If the Tape Label data is known then the Cell Contents Database 302 is returned to the LCU 112. IF the Tape Label Data is not known then the Audit Subsystem 303 is called. When the Audit subsystem 303 is called, a request for a picture is issued on line 305 to the line scan camera software interface 304. Control then transfers to operation 310 where the state of the camera is queried. If the camera is on, control transfers to operation 312 which provides a delay until the picture gathered is complete. The camera interface 304 then transfers control to operation 306 where data is accumulated for the picture. When sufficient data is accumulated, control transfers to operation 308 where the picture data is registered. When the picture is complete, control transfers back to the Line Scan Camera Software Interface operation 304 and thence via line 313 to the Audit subsystem 303 and the Tape Label Data is written to the Cell Contents Database 317.

If the camera is not on in query operation 310, control transfers to operation 314 where the camera is turned on. A Request for a Picture turns on the Camera Enable 208 to start the camera and its associated clocking. Control remains in operation 314 until a camera saturation condition is cleared, at which time control transfers to operation 312 as discussed in the previous paragraph. When the Label Data is known and there are no more requests for pictures the Line Scan Camera Software Interface 304 turns off the camera and its associated clocking.

The audit subroutine 303 described above is typically only invoked when the system is reset or upon opening or closing the doors into the unit. Otherwise the audit subroutine is invoked only when an error condition is detected such as cells being unexpectedly full or empty or the Get/Put call system stalls.

The above specification, examples and data provide a complete description of one embodiment of the method and the apparatus of the invention. Many variations of the invention will be readily apparent to those skilled in the art. Since many embodiments of the invention can be made without departing from the spirit and scope of the invention, all such modifications and variations are envisioned as being within the scope of the invention as defined by the following claims.

What is claimed is:

1. A data cartridge handling system comprising:
    a data cartridge storage array having a plurality of bins each for removably receiving and storing a data cartridge;
    a robotic manipulator operatively positioned for selectively retrieving data cartridges from the bins, transferring the retrieved data cartridges to and from a data reading and recording device and replacing data cartridges into the bins in accordance with instructions received from a control system operatively coupled to the robotic manipulator for directing movement of the manipulator, the manipulator including a grasping hand for grasping a selected data cartridge and moving the data cartridge in and out of a bin and a camera mounted on the hand for sensing the location of the hand with reference to each of the plurality of bins, wherein the camera is operated during an audit operation initiated by the control system to provide bin location data to a memory subsequently utilized by the control system to position the grasping hand of the robotic manipulator, and wherein the camera includes an oscillator located on the hand whose output is selectively provided to enable the camera during an audit operation.

2. A data cartridge handling system as defined in claim 1 wherein the camera is utilized only during the audit operation.

3. A system as defined in claim 1 wherein the camera further provides cartridge identification data to the memory to provide a map of bin location and bin content.

4. A system as defined in claim 3 wherein manipulator positioning Is only controlled by the camera during an audit operation.

5. A system as defined in claim 1 wherein the control system routinely directs movement of the robotic manipulator utilizing location data from the memory and operates the camera only during an audit operation.

6. A data cartridge handling system comprising:
a data cartridge storage array having a plurality of bins each for removably receiving and storing a data cartridge;
a robotic manipulator operatively positioned for selectively retrieving data cartridges from the bins, transferring the retrieved data cartridges to and from a data reading and recording device and replacing data cartridges into the bins in accordance with instructions received from a control system operatively coupled to the robotic manipulator for directing movement of the manipulator the manipulator including a grasping hand for grasping a selected data cartridge and moving the data cartridge in and out of a bin and a camera mounted on the hand for sensing the location of the hand with reference to each of the plurality of bins, wherein the camera is operated during an audit operation initiated by the control system to provide bin location data to a memory subsequently utilized by the control system to position the grasping hand of the robotic manipulator; and
an oscillator whose output is selectively provided to the camera on the hand only during an audit operation.

7. A data cartridge handling library apparatus having reduced electromagnetic radiation emissions comprising:
a plurality of data cartridge storage bins arranged around a robotic manipulator for retrieving and replacing cartridges from and to the bins;
a camera mounted on the manipulator for sensing a position of the manipulator with respect to the plurality of data cartridge storage bins, the camera being operable during an audit operation to identify each bin location;
a manipulator control system operatively coupled to the robotic manipulator for selectively controlling movement of the manipulator and operating the camera to sense and record manipulator position information at each bin location and store position and bin location information in a memory accessible by the manipulator control: and
a grasping hand on the manipulator having the camera mounted thereon, the camera having an oscillator having an output enabled by the control system, wherein the control system disables the output of the oscillator and performs data cartridge storage and retrieval operations utilizing the bin location and manipulator position information stored in the memory during normal library operations.

8. The apparatus according to claim 7 system wherein the control system performs data cartridge storage and retrieval operations utilizing the bin location and manipulator position information stored in the memory to position the manipulator.

9. The apparatus according to claim 7 wherein the manipulator comprises a grasping hand having the camera mounted thereon.

10. The apparatus according to claim 9 wherein the output of the oscillator is enabled to operate the camera during an audit operation by providing a clocking signal to electronic circuitry associated with the camera.

11. The apparatus according to claim 7 wherein the oscillator output is enabled only during an audit operation by the manipulator control system.

12. A method for reducing electromagnetic radiation emissions from a data cartridge handling library apparatus comprising the steps of:
providing a plurality of data cartridge storage bins arranged around a robotic manipulator for retrieving and replacing cartridges from and to the bins
providing a manipulator control system operatively coupled to the robotic manipulator for selectively controlling movement of the manipulator;
providing a camera mounted on the manipulator for sensing a position of the manipulator with respect to the plurality of data cartridge storage bins;
turning on the camera;
performing an audit operation using the camera to identify each bin location, record manipulator position information at each bin location and store bin location information in a memory accessible by the manipulator control system;
turning the camera off, and then performing subsequent data cartridge storage and retrieval operations utilizing the bin location and manipulator position information stored in the memory to position the manipulator with the camera off.

13. A method as defined in claim 12 wherein the manipulator comprises a grasping hand having the camera mounted thereon and the step of turning on the camera includes the step of enabling an output of an oscillator mounted on the hand to provide a clocking signal to electronic circuitry associated with the camera.

14. The method as defined in claim 13 wherein the step of turning off the camera includes disabling the output of the oscillator mounted on the hand.

15. A method for reducing electromagnetic radiation emissions from a data cartridge handling library apparatus comprising the steps of:
providing a plurality of data cartridge storage bins arranged around a robotic manipulator for retrieving and replacing cartridges from and to the bins
providing a manipulator control system operatively coupled to the robotic manipulator for selectively controlling movement of the manipulator;
providing a camera mounted on the manipulator for sensing a position of the manipulator with respect to the plurality of data cartridge storage bins;
operating the camera during an audit operation to identify a bin location, record manipulator position information at the bin location and store bin location information in a memory accessible by the manipulator control system; and
turning the camera off and then performing subsequent data cartridge storage and retrieval operations utilizing the bin location and manipulator position information stored in the memory to position the manipulator with the camera off.

16. The method according to claim 15, wherein the step of turning the camera off includes the step of disabling an output of an oscillator that when otherwise enabled, provides a clocking signal to electronic circuitry associated with the camera.

* * * * *